United States Patent [19]
Everest

[11] 3,738,749
[45] June 12, 1973

[54] RANGEFINDERS
[76] Inventor: Frank G. Everest, 287 Lonsdale Road, Stevenage, England
[22] Filed: Oct. 12, 1971
[21] Appl. No.: 188,325

[30] Foreign Application Priority Data
Oct. 15, 1970 Great Britain................... 49,091/70

[52] U.S. Cl. ..................... 356/5, 356/4, 343/5 DP
[51] Int. Cl. ............................................. G01c 3/08
[58] Field of Search .................. 356/4, 5; 340/1 C; 343/5 DP

[56] References Cited
UNITED STATES PATENTS
3,315,258  4/1967  Dillard.............................. 343/5 DP
3,409,368  11/1968  Fernandez ............................. 356/5

Primary Examiner—Benjamin A. Borchelt
Assistant Examiner—S. C. Buczinski
Attorney—Solon B. Kemon, Carroll Palmer and William T. Estabrook

[57] ABSTRACT

In a rangefinder (for example a laser rangefinder) emitting a pulse of electromagnetic energy, a pulse generator steps a counter to generate a progressively increasing signal following the emission of a pulse for a period corresponding to the delay before reception of a reflected pulse at the maximum range of interest. When a reflected signal is received the count at that instant is stored but subsequent reflections during the same period cause the stored value to be erased and replaced by the subsequent count. At the end of the said period the last stored value is transferred to a display unit. In this way, echoes from partially reflecting media between the emitter and a target are ignored.

5 Claims, 1 Drawing Figure

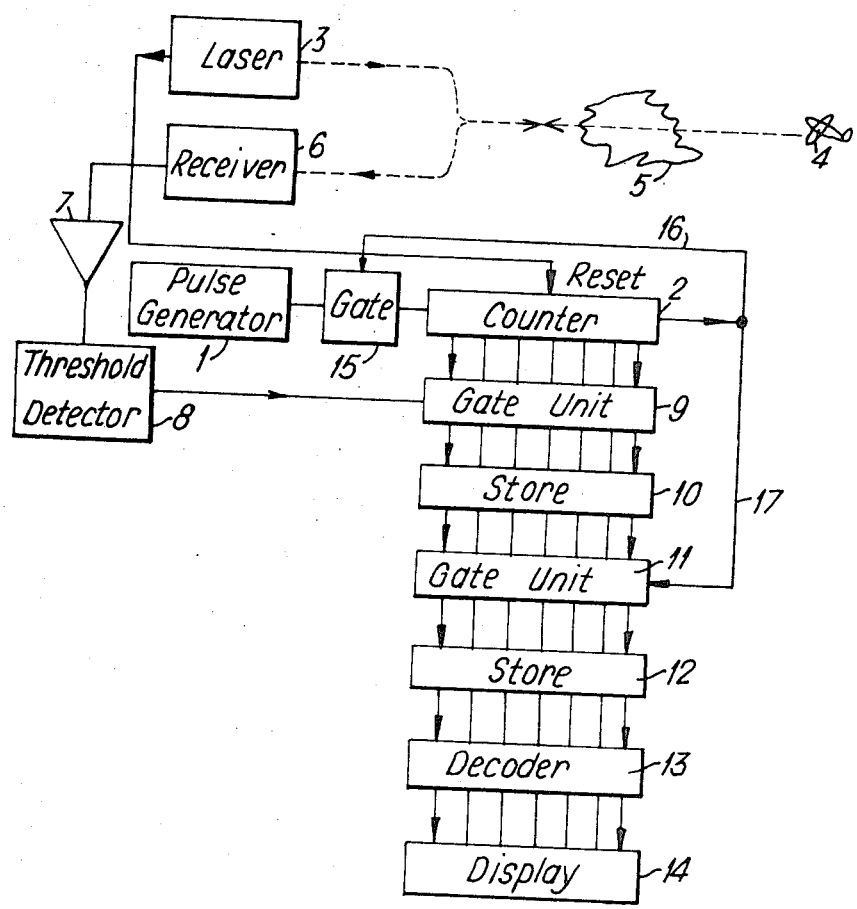

RANGEFINDERS

This invention is concerned with rangefinders comprising an emitter for emitting a pulse of electromagnetic energy and a detector for detecting the receipt of electromagnetic energy due to the reflection of the emitted pulse, the detector generating a corresponding electric signal. The invention is particularly applicable to laser rangefinders using a short transmitted pulse for seeking a target throughout a predetermined range variation. Laser rangefinders using a short transmitted pulse are subject to some ambiguity because the measured range may be that of a fog patch or other light-reflecting medium located between the rangefinder and the target instead of that of the target itself. The object of the present invention is to provide an apparatus for measuring range to a target which ignores reflections from reflecting media through which the transmitted pulse passes on its way to the target.

According to the present invention, the rangefinder comprises means generating a progressively increasing electric signal for a period corresponding to a predetermined maximum range, storage means responsive to each reflection-representing signal from the detector during the said period for storing a value corresponding to the magnitude of the progressively increasing signal at the instant of receipt of each reflection of an emitted pulse, a range indicator for displaying a stored value, and control means whereby the range indicator receives only the last value stored during the said period, whereby echoes from partially reflecting media between the emitter and the target are ignored. In the preferred form of apparatus, each stored value following an emitted pulse erases any preceding stored value and a second storage means is provided to receive the final contents of the first storage means at the end of the said period corresponding to the predetermined maximum range. In this preferred form, the means for generating the progressively increasing electric signal consists of a counter supplied by a pulse generator.

It will be clear that although, between a laser and a target, there may be several patches of fog each of which causes a partial reflection of the emitted light pulse, all stored counts preceding the last will be ignored, the last stored count being indicated as the required range.

In order that the invention may be better understood, one example of apparatus embodying the invention will now be described with reference to the accompanying drawing.

In the drawing, a pulse generator 1 drives a counter 2 having a total count of 1,000 and a laser pulse generator 3 emits a very intense light pulse directed at a target 4. Each time a pulse is emitted the counter is reset to zero and starts to count the clock pulses. The laser pulse, although aimed at the target 4 may pass through a patch of fog 5 (or through other light reflecting media) on its way to the target, and a signal reflected back from the patch of fog 5 will be received by a receiver 6 in advance of the signal reflected back from the target. There may be a number of signals reflected back by various light reflecting media between the generator 3 and target 4.

The first reflected signal received in receiver 6 is passed through an amplifier 7 and a threshold detector 8 to a gate 9. The trailing edge of the signal pulse drives the gate 9 which causes the count existing in the counter 2 at that instant to be transferred to a store 10. The counter 2 continues to count until the returned signal from the target 4 reaches the receiver 6 and is fed through the amplifier 7 and threshold detector 8 to the gate 9. The gate 9 then allows the count in counter 2 at that instant to pass to the store 10 where it erases the preceding count. This second count is higher than that previously received by store 10 and which resulted from the signal received back from the patch of fog 5. Clearly, if several patches of fog existed, the gate 9 would have been opened for each returned signal but the count existing at the time of receipt of the signal from the target would be higher than any of them. The stored data is thus updated at every received pulse, with a count representing the time of receipt of the latest pulse, the final stored count representing the target distance. There cannot be a signal returned from a distance further than the target.

The filling of the counter results in the generation of a pulse which is applied by way of conductor 16 to a gate 15 to stop the count by closing the gate 15 and which is also applied by way of conductor 17 to a second gate 11 which is opened by the pulse. This takes place both when the laser emits regular pulses or when the laser emits a single pulse. The effect of the pulse from the counter on the gate 11 is that the count stored in store 10 (which is representative of the range of the target) is passed to a read-out store 12 which is provided with a decoding matrix 13 supplying signals to a bank 14 of display tubes to give a visual read-out of the range.

A typical accuracy required is ± 10 meters to 10 Km and 10 meters represents a time error of 66.7nS. To achieve this accuracy the counter must be capable of running at 15 MHz. The counter is a five stage binary coded decimal counter giving a count of 1,000, and for a 66.7nS input this represents a cycle time of 66.7nS, or 10Km maximum range. It is reset to zero with each transmitted laser pulse by the pulse generator.

The receiver and amplifier are optimized for signal-noise ratio, and for 10 nS transmitted pulses the optimum receiver bandwidth is about 40 MHz. The output is fed to the threshold detector 8 set at six times the r.m.s. noise level to give adequate probability of detection and low false alarm rate. The output of the detector 8 may be fed to a gate driver to produce an output at the trailing edges of the threshold output.

The above description concerns an arrangement for parallel processing the output from the store 10, but to reduce complexity an arrangement for series processing the output may be employed by including a shift register in place of the store 10, the output from which would be by way of a single pair of wires.

I claim:

1. A rangefinder comprising an emitter for emitting a pulse of electromagnetic energy, a detector for detecting the receipt of electromagnetic energy due to the reflection of the emitted pulse and generating a corresponding electric signal, means generating a progressively increasing electric signal for a period corresponding to a predetermined maximum range, storage means responsive to each reflection-representing signal from the detector during the said period for storing a value corresponding to the magnitude of the progressively increasing signal at the instant of receipt of each reflection of an emitted pulse, a range indicator for displaying a stored value, and inhibiting means responsive to the detector output and operative in response to a received reflection to prevent the application to the range indicator of stored values corresponding to previously received echoes, and means for transferring to the range indicator at the end of the said period the stored value corresponding to the last received echo, whereby echoes from partially reflecting media between the emitter and the target are ignored.

2. A rangefinder comprising a laser for emitting a pulse of light, a detector for detecting the receipt of reflected laser light and generating a corresponding electric signal, a counter, a pulse generator providing periodic signals to drive the counter for a period corresponding to a predetermined maximum range, storage means, and means responsive to each reflection-representing signal from the detector during the said period for transferring to the storage means a value corresponding to the count existing in the counter at the instant of receipt of the reflected laser light, each transfer to the storage means erasing any earlier stored value, a range indicator for displaying a stored value, and means for transferring to the range indicator the stored value at the end of the said period, whereby reflections from partially reflecting media between the laser and the target are ignored.

3. A rangefinder in accordance with claim 2, in which the means for transferring the stored value comprises a second store and means for transferring the contents of the first store to the second store each time the counter is full.

4. A rangefinder in accordance with claim 2, including means for resetting the counter each time a light pulse is emitted.

5. A rangefinder in accordance with claim 1, in which the means generating a progressively increasing electric signal comprises a pulse generator and a counter receiving pulses from the pulse generator.

* * * * *

UNITED STATES PATENT OFFICE
CERTIFICATE OF CORRECTION

Patent No. 3,738,749   Dated  June 12, 1973

Inventor(s)  Frank G. Everest

It is certified that error appears in the above-identified patent and that said Letters Patent are hereby corrected as shown below:

Please Add: Assignment Data

[73] --   Assignee British Aircraft Corporation Limited, a British Company,  --.

Signed and sealed this 29th day of January 1974.

(SEAL)
Attest:

EDWARD M. FLETCHER, JR.
Attesting Officer

RENE D. TEGTMEYER
Acting Commissioner of Patents